(12) United States Patent
Berzanskis et al.

(10) Patent No.: US 7,602,919 B2
(45) Date of Patent: Oct. 13, 2009

(54) METHOD OF INTEGRATING QKD WITH IPSEC

(75) Inventors: Audrius Berzanskis, Cambridge, MA (US); Harri Hakkarainen, Los Gatos, CA (US); Keun Lee, Newburyport, MA (US); Muhammad Raghib Hussain, Pleasanton, CA (US)

(73) Assignee: MagiQ Technologies, Inc, New York, NY (US)

( * ) Notice: Subject to any disclaimer, the term of this patent is extended or adjusted under 35 U.S.C. 154(b) by 826 days.

(21) Appl. No.: 11/082,068

(22) Filed: Mar. 16, 2005

(65) Prior Publication Data

US 2006/0212936 A1 Sep. 21, 2006

(51) Int. Cl.
*H04L 9/12* (2006.01)
*H04L 29/06* (2006.01)
(52) U.S. Cl. .................. 380/277; 380/278; 713/150
(58) Field of Classification Search ............... None
See application file for complete search history.

(56) References Cited

U.S. PATENT DOCUMENTS

| 5,768,378 | A * | 6/1998 | Townsend et al. ........... 380/256 |
| 6,035,405 | A * | 3/2000 | Gage et al. .................... 726/15 |
| 7,460,670 | B1 * | 12/2008 | Elliott ......................... 380/256 |
| 2002/0188871 | A1 | 12/2002 | Noehring et al. |
| 2004/0120528 | A1 * | 6/2004 | Elliott et al. ................ 380/278 |
| 2004/0190719 | A1 * | 9/2004 | Lo ............................. 380/255 |
| 2005/0063547 | A1 * | 3/2005 | Berzanskis et al. .......... 380/278 |
| 2006/0059343 | A1 * | 3/2006 | Berzanskis et al. .......... 713/171 |

FOREIGN PATENT DOCUMENTS

WO WO 2004015545 A2 * 2/2004
WO WO 2004073234 A2 * 8/2004

OTHER PUBLICATIONS

Elliott et al, "Quantum Cryptography in Practice", ACM, copyright 2003, pp. 227-238.*
Sfaxi et al, "Enhancing IP security by integrating Quantum Key Distribution into communication processes", ConTEL 2005, pp. 35-40.*
Chip Elliott, "Building the quantum network", New Journal of Physics, published Jul. 12, 2002, pp. 1-13.*
Gay et al, "Communicating Quantum Processes", ACM, copyright Jan. 2005, pp. 145-.*
Ghernaouti-Helie et al, "How QKD can improve the security level of future e-commerce transactions", 2 pages, unknown date.*
Ghernaouti-Helie et al, "Guaranteerring Security of Financial Transaction by Using Quantum Cryptography in Banking Environment", copyright 2007, pp. 139-149.*
Maughan et al, "Internet Security Association and Key Management Protocol (ISAKMP)", Request for Comments: 2408, published Nov. 1998, pp. 1-86.*

* cited by examiner

*Primary Examiner*—Ponnoreay Pich
(74) *Attorney, Agent, or Firm*—Opticus IP Law PLLC

(57) ABSTRACT

A method of integrating quantum key distribution (QKD) with Internet protocol security (IPSec) to improve the security of IPSec. Standard IPSec protocols impose limits on the frequency at which keys can be changed. This makes efforts to improve the security of IPSec by employing quantum keys problematic. The method includes employing multiple security associations (SA) in in-bound and outbound SA Tables in a manner that enables a high key flipping rate and that enables combining quantum keys with classical keys generated by Internet Key Exchange (IKE), thereby enabling QKD-based IPSec.

14 Claims, 4 Drawing Sheets

US 7,602,919 B2

METHOD OF INTEGRATING QKD WITH IPSEC

FIELD OF THE INVENTION

The present invention relates to quantum cryptography and Internet communication, an in particular relates to methods of integrating quantum key distribution (QKD) with Internet protocol security ("IPSec") to provide for enhanced security of Internet-based data communication.

BACKGROUND INFORMATION

Quantum Key Distribution

Quantum key distribution (QKD) involves establishing a key between a sender ("Alice") and a receiver ("Bob") by sending "qubits" (i.e., weak optical pulses having less than one photon, on average) over a "quantum channel." The security of the key distribution is based on the quantum mechanical principle that any measurement of a quantum system in unknown state will modify its state. As a consequence, an eavesdropper ("Eve") that attempts to intercept or otherwise measure the qubits will introduce errors and reveal her presence. Once a key is successfully established between Bob and Alice, they can communicate over a public channel by using the exchanged key to encrypt their messages using perfectly secure one-time pad encryption or some other symmetric key encryption algorithm. In present-day QKD technology, keys of a suitable length (e.g., 256 bits) can be generated at a rate of about 1-100 per second, depending on the separation between Alice and Bob (e.g., the length of the optical fiber length connecting the two).

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, which is incorporated herein by reference, and in the article by C. H. Bennett entitled "Quantum Cryptography Using Any Two Non-Orthogonal States", Phys. Rev. Lett. 68 3121 (1992), which is also incorporated herein by reference. The general process for performing QKD is described in the book by Bouwmeester et al., "The Physics of Quantum Information," Springer-Verlag 2001, in Section 2.3, pages 27-33, which is incorporated by reference herein as background information.

IPSec

The acronym "IPSec" is a contraction of the phrase "Internet Protocol (IP) Security." IPSec is a set of protocols developed by the Internet Engineering Task Force (IETF), the main Internet standards organization. The protocols are designed to support the secure exchange of information over the Internet—more specifically, the exchange of packets at the IP layer. IPSec is the most popular method of implementing secure data communication channels over the Internet, and is used widely to provide security for the operation of virtual private networks (VPNs).

The basics of IPSec are described in the publication by Stephen Kent and Randall Atkinson, entitled, "Security Architecture for the Internet Protocol," RFC 2401, published by and available from The Internet Engineering Task Force (IETF), 1998, which publication is incorporated by reference herein.

When sending information over the Internet, the information is broken up into "packets," which allows for efficient management of Internet traffic. The packets travel separately over the Internet towards a receiving device at a designated address. The packets are then reassembled so that they have their original order at the receiver.

Sensitive information sent over the Internet can be encrypted via IPSec to maintain the secrecy of the information. IPsec supports "Transport" and "Tunnel" encryption modes. The Transport mode encrypts only the data portion (payload) of each packet, but leaves the header untouched. The Tunnel mode encrypts both the header and the payload and is thus more secure. On the receiving side, an IPSec-compliant device decrypts each packet according to the particular encryption mode.

There are two main IPSec protocols—Authentication Header (AH) and Encapsulating Security Payload (ESP). The AH protocol is mainly used for data authentication purposes, while the ESP protocol provides authentication and data confidentiality. The AH and ESP protocols can protect either an entire IP payload (Tunnel mode) or the upper-layer protocols of an IP payload (Transport mode).

The operation of IPSec requires the transmitter and receiver in the network to share a set of secret keys. This is accomplished through a protocol known as the "Internet Key Exchange" or IKE, which is described in the publication by D. Harkins and D. Carrel, entitled, "The Internet Key Exchange (IKE)," RFC 2409, published by and available from The Internet Engineering Task Force (IETF), 1998. This protocol allows the sender and receiver to obtain a set of public keys and to identify ("authenticate") each other via digital certificates. IPSec protocol uses the keys to create the Security Associations (SA). A maximum of two decryption SAs are supported at a time in standard IPSec implementation.

Standard implementation of IPSec imposes inherent limitations on how frequently the keys can be changed. This is a central problem when attempting combine QKD and IPSec to increase security. As mentioned above, QKD is capable of providing many keys per second (e.g., 100 keys/second or even more), while IPSec's fastest key change rate is around once per second. To make use of the QKD-generated keys for IPSec, one would want to be able change them as fast as possible.

Also, IKE is used to provide keys for IPSec, and QKD is not a part of IKE. Accordingly, there is presently no way to incorporate QKD-generated keys into the IKE process so that QKD-generated keys can be used in IPSec.

SUMMARY OF THE INVENTION

The present invention relates to quantum cryptography and Internet communication, in particular relates to methods of integrating quantum key distribution (QKD) with Internet protocol security ("IPSec") to provide for enhanced security of Internet-based data communication.

Standard IPSec protocols impose limits on the frequency at which keys can be changed, making efforts to improve the security of IPSec by employing quantum keys problematic. The method includes increasing the size of the Security Association (SA) Table in a manner that enables fast key flipping so that the quantum keys can be combined with the classical keys generated by Internet Key Exchange (IKE). The invention includes a method of creating the SA Table by combining (e.g., XOR-ing) quantum keys generated by the QKD process with classical keys generated by the IKE process, thereby enabling QKD-based IPSec.

DETAILED DESCRIPTION OF THE INVENTION

As mentioned above, in the standard implementation of IPSec, each IPSec tunnel maintains two SA Tables, one for inbound data traffic and the other for outbound data traffic. Each Table, in turn, contains a maximum of two SAs at a time. This imposes restrictions on how often the keys can be changed because IP packets might be delivered to the decrypting side with a delay and out of order. This happens especially often if the packets have to traverse the Internet.

During transmission of information over the Internet, the IP packets may arrive at the receiver out of order. Thus, the SA Table needs to be long enough to ensure that all the encrypted packets are received in the proper order at the receiver and are properly decrypted.

Accordingly, an aspect of the invention involves increasing the SA Table size. This enables fast key flipping while also ensuring the proper encryption/decryption and delivery order of the packets. Described below is an exemplary implementation based on the processor known under the trademark NITROX II, available from Cavium Networks, Santa Clara, Calif. The number of tunnels and SAs in a Table can vary for different implementations.

Figure 1:
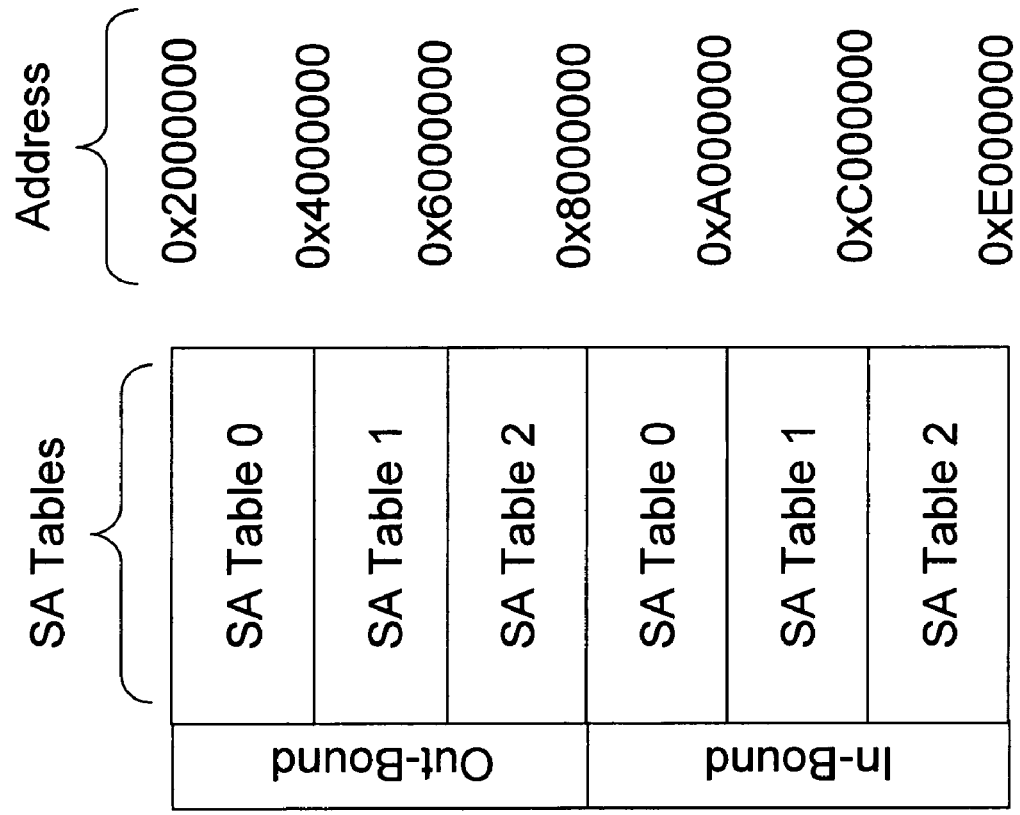
FIG. 1 is a schematic diagram of the SA Table structure of the present invention adapted for fast key flipping, illustrating an exemplary implementation for three IPSec tunnels.

FIG. 1 is a schematic diagram of the SA Table structure illustrating an exemplary implementation for 3 IPSec tunnels. FIG. 1 illustrates a Cavium NITROX II (N2) memory that contain six SA Tables. Each IPsec tunnel uses two SA Tables, one for each direction of the traffic. Each SA Table contains up to $2^{16}$ SAs (32 Mbytes, or 0x2000000). "Flipping key" means using the next SA in the out-bound SA Table. There are up to three tunnels per N2 card: a data tunnel 0: SA Table 0 (in- and out-bound), a data tunnel 1: SA Table 1 (in- and out-bound), and a control tunnel: SA Table 2 (in-and out-bound). In operation, the host software sets up the SA Tables in N2 memory, and the N2 microcode accesses the SA Tables to encrypt/decrypt the packets.

Figure 2:
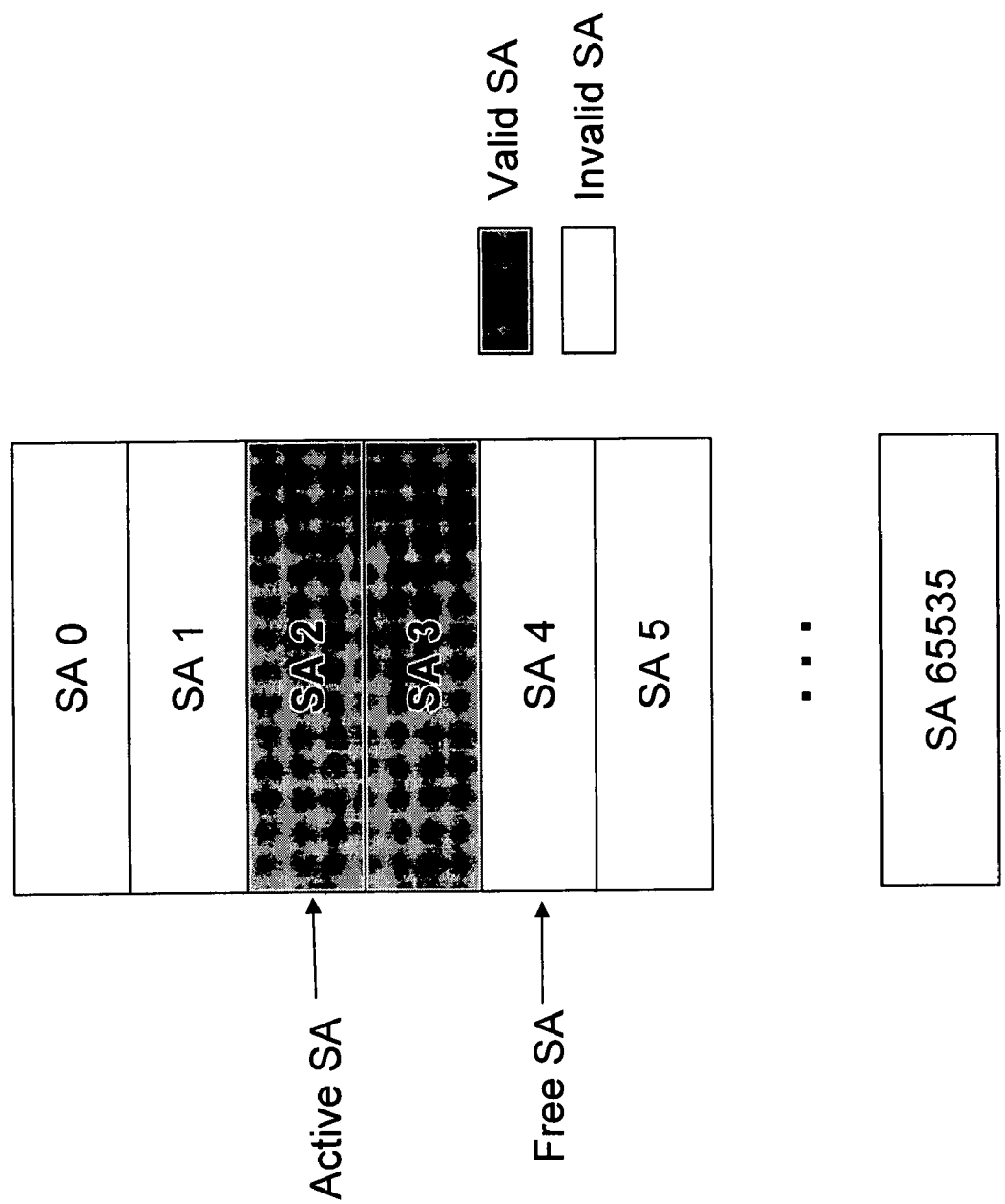
FIG. 2 is a schematic diagram of the SA Table structure of FIG. 1 for the transmitter side.

FIG. 2 is a schematic diagram of the SA Table structure on the transmitter side. There are $2^{16}$ SAs in each SA Table. Each SA is, for example, 512 bytes long. The SA Tables are numbered from 0 to $2^{16}-1$.

Two SA pointers are used to manage the SA Table:
Active SA: SA number of currently active SA. The N2 microcode uses the SA pointed by Active to encrypt the packet. Initial value is 0.
Free SA: SA number of the first free SA slot. Appending a new SA increments Free SA by one wrapping around to 0 after $2^{16}-1$. Initial value is 0 indicating SA 0.

The SA Table ID and the SA number in the SA Table are encoded in the security payload index (SPI) field of the ESP header. The decryption node extracts the SA Table ID and the SA number from the SPI field of the received packet to decrypt the packet. The encryption node advances the active SA to the next one when the time- or byte-lifetime expires.

Figure 3:
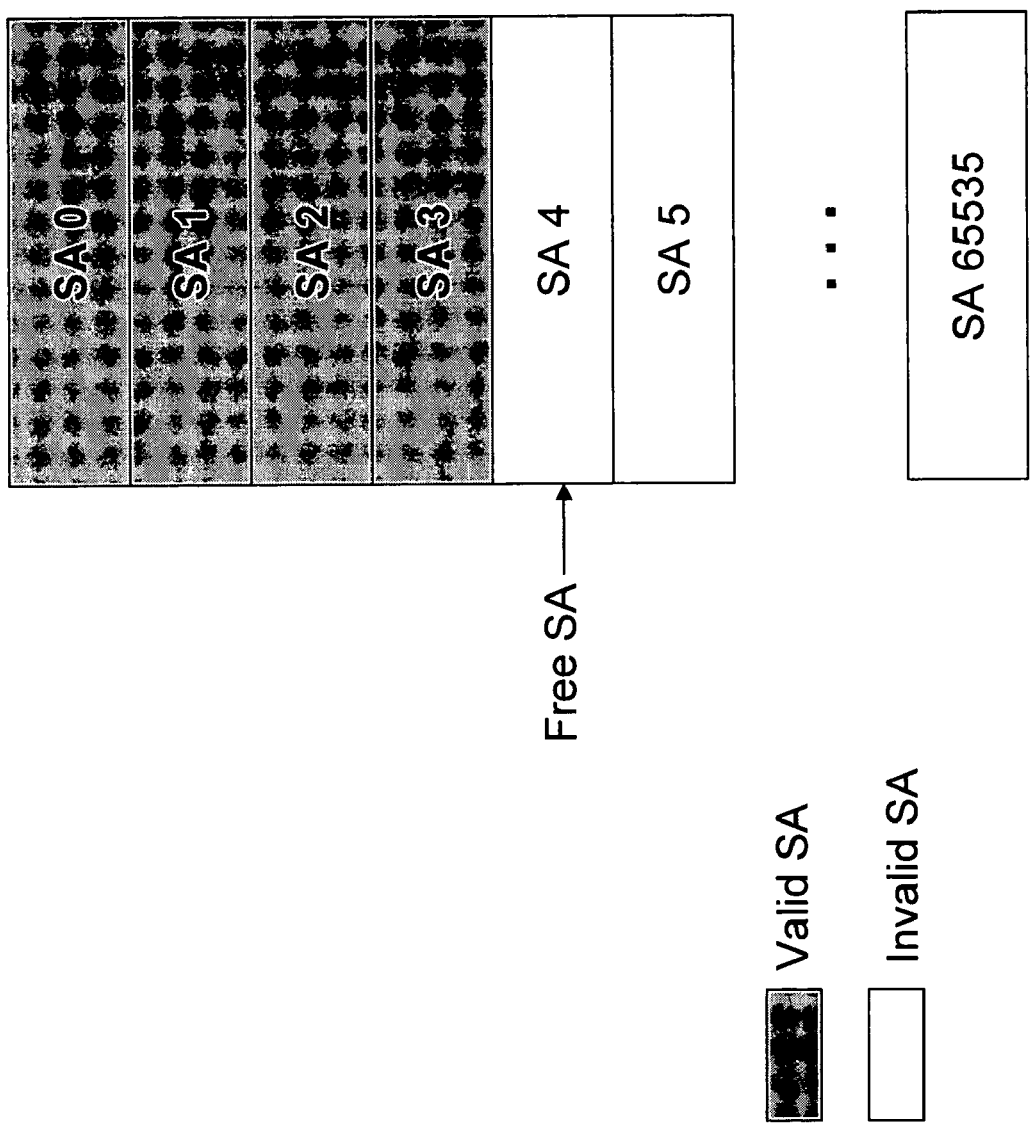
FIG. 3 is a schematic diagram of the SA Table structure of FIG. 1 for the receiver side.

FIG. 3 is a schematic diagram of the SA Table structure on the receiver side. The receiver side structure is exactly the same structure as that of the transmitting side (FIG. 2). The receiver side extracts the SA Table ID and the SA number from the SPI field of the received packet and finds an appropriate SA. A large number of SAs in the memory ensures that SAs are not being removed from the memory before all reasonably delayed packets are decrypted. The key flipping rate and Table size determine the maximum allowable packet delay time. This delay can be adjusted by forming an appropriately sized SA Table.

Integrating QKD with IKE

As mentioned above, IKE provides "classic cryptography" keys for implementing standard IPSec. In general, QKD could directly replace IKE and "quantum keys" can be used instead of keys provided by IKE. A better approach however, is to combine QKD and IKE. This is a layered security approach because an attacker would need to break both layers to have access to encrypted information.

Figure 4:
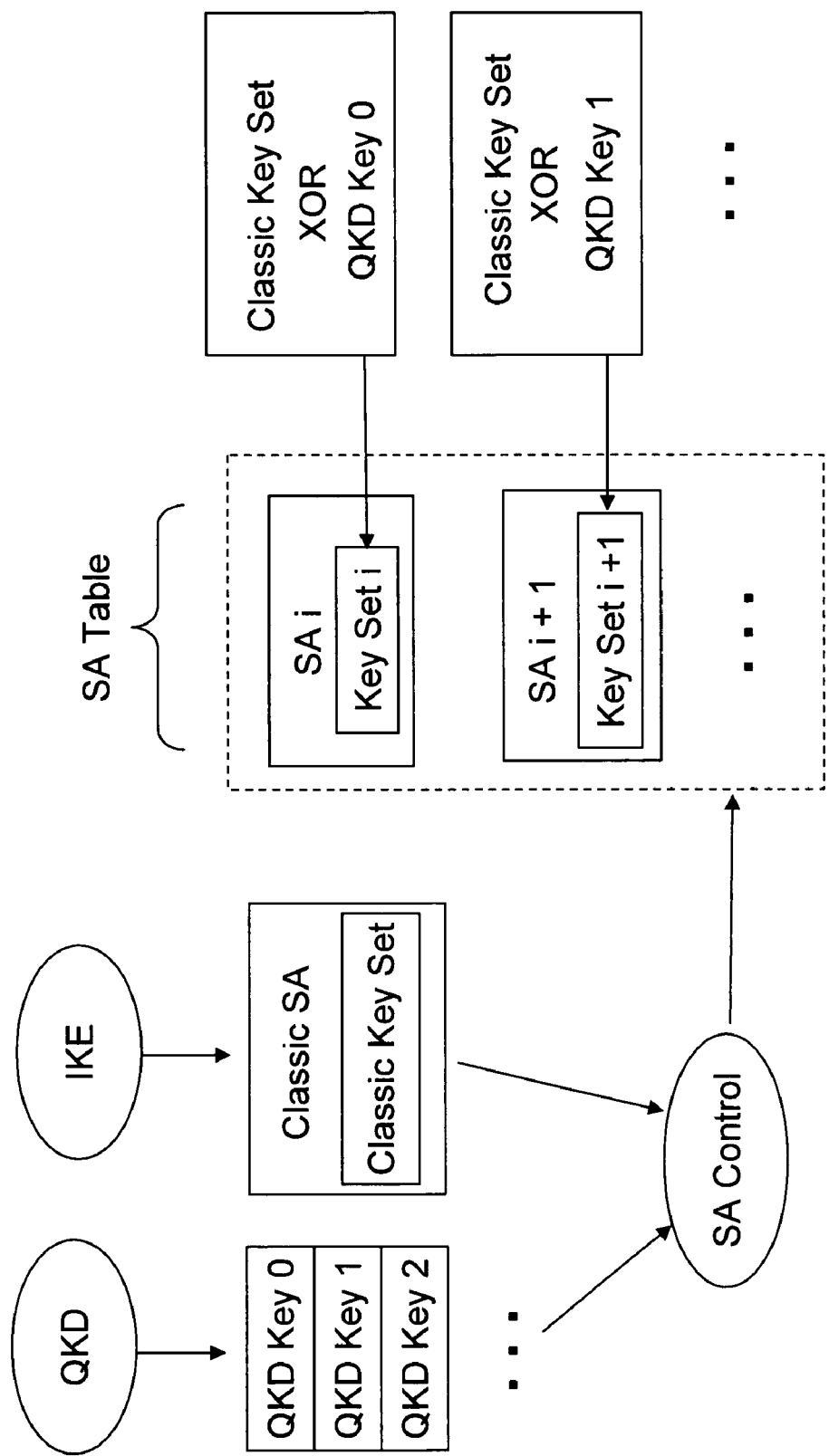
FIG. 4 is a schematic diagram illustrating the steps of creating an SA that integrates QKD with IKE in parallel.

FIG. 4 is a schematic diagram illustrating SA creation in a manner that integrates QKD with IKE. The SAs are created in three steps. First, a classic SA pair (in-bound and out-bound) is created using the standard IKE protocol. Second, a final SA pair is created from the classic SA pair by combining (e.g., XOR-ing) the encryption and authentication keys with the keys created by the QKD protocol. This process is carried out N times using different QKD keys. Third, the N final SA pairs are appended to the SA Tables automatically. A new classic SA pair may be created periodically according to standard IKE procedures.

As illustrated in FIG. 4, IKE and QKD are run in parallel. The final "quantum-classical" key used to create SA is a combination of the keys provided by IKE and QKD. In an example embodiment, the final key is an XOR value of the IKE and QKD keys (i.e., (classic key) XOR (quantum key)). In this approach, QKD lays transparently on top of the traditional cryptography. Accordingly, cracking the final key requires cracking both traditional and quantum cryptography. The entropy of the final keys is guaranteed to be equal to or greater than the entropy of the classical keys.

The creation of the final SAs from the classical SA takes very little time since it is a local operation. The SA life-time can therefore be orders of magnitude shorter than the classical IKE re-keying time.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of integrating quantum keys and classical keys for IPSec using Security Association (SA) tables and at least one IPSec tunnel, comprising:
    a) for each IPSec tunnel, creating an inbound and outbound classic SA pair using a standard Internet Key Exchange (IKE) protocol;
    b) creating a final SA pair from the inbound and outbound classic SA pair by combining classic keys associated with the inbound and outbound classic SA pair with quantum keys;
    c) repeating b) N times using different quantum keys to generate N final SA pairs; and d) appending the N final SA pairs to corresponding inbound and outbound SA tables, wherein the classic keys and quantum keys are combined in a microprocessor using microcode embodied in host software stored in a processor-readable memory.

2. The method of claim 1, wherein said combining includes XOR-ing the classic keys and the quantum keys.

3. The method of claim 1, including creating the classic keys and the quantum keys in parallel.

4. The method of claim 1, wherein the classic keys each include an authentication key and an encryption key.

5. The method of claim 1, further including:
employing host software in the processor-readable memory to set up the inbound and outbound SA tables.

6. The method of claim 5, further including:
accessing the inbound and outbound SA tables in the processor-readable memory to encrypt and decrypt information sent in Internet protocol (IP) packets through an IPSec tunnel.

7. The method of claim 1, including providing $2^{16}$ security associations (SAs) in each of the inbound and outbound SA tables.

8. The method of claim 1, including storing security associations (SAs) in memory so that the SAs are not removed from memory before all delayed Internet protocol (IP) packets are decrypted.

9. The method of claim 8, further including establishing a maximum allowable IP packet delay time based on a key flipping rate and an SA table size.

10. The method of claim 9, further including adjusting the maximum allowable IP packet delay time by adjusting the SA table size.

11. The method of claim 1, further including encoding an SA table identification (ID) and an SA number in a security payload index (SPI) field of an encapsulating security payload (ESP) header of an Internet protocol (IP) packet.

12. The method of claim 11, further including, at a decryption node:
receiving the IP packet;
extracting the SA table ID and SA number from the SPI field; and
decrypting the IP packet based on the extracted SA table ID and SA number.

13. The method of claim 1, wherein the SA table has an associated structure, and each IPSec tunnel includes receiver and transmitting sides having the same SA table structure.

14. The method of claim 1, further including generating the quantum keys via quantum key distribution.

* * * * *